No. 620,753. Patented Mar. 7, 1899.
T. H. DONLON.
ANIMAL TRAP.
(Application filed Apr. 30, 1898.)
(No Model.)
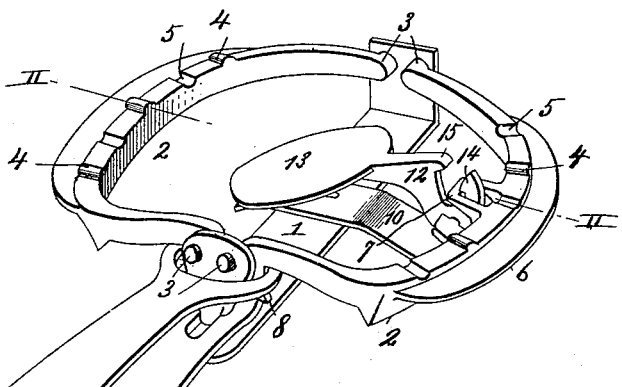
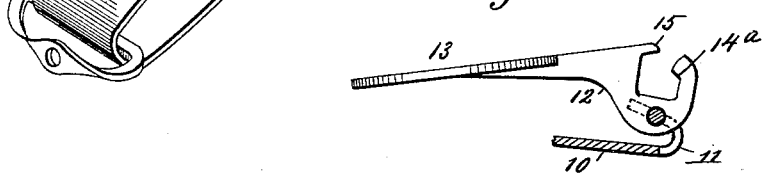
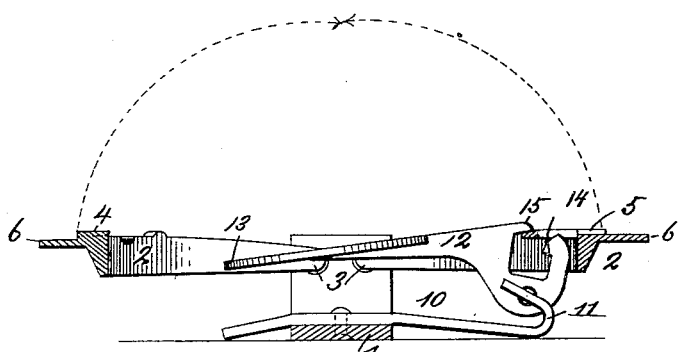
Witnesses:
M. P. Remley
F. S. Thrasher
Inventor:
T. H. Donlon
By Higdon, Fischer & Thorpe
Attys.

UNITED STATES PATENT OFFICE.

THOMAS H. DONLON, OF KANSAS CITY, KANSAS, ASSIGNOR OF TWO-THIRDS TO ATWELL BYRD, OF SAME PLACE.

ANIMAL-TRAP.

SPECIFICATION forming part of Letters Patent No. 620,753, dated March 7, 1899.

Application filed April 30, 1898. Serial No. 679,308. (No model.)

*To all whom it may concern:*

Be it known that I, THOMAS H. DONLON, of Kansas City, Wyandotte county, Kansas, have invented certain new and useful Improvements in Animal-Traps, of which the following is a specification.

My invention relates to animal-traps, and is designed as an improvement upon the trap described in Patent No. 518,024, issued to me on April 10, 1894.

The object of the present invention is to provide a trap which may be easily "set" without necessitating the removal of the operator's gloves.

A further object is to provide a self-locking trap of this character in order to provide against the contingency of an accidental closing movement and possibly serious injury to the operator's hand.

With these objects in view the invention consists in certain novel and peculiar features of construction and combination of parts, as will be hereinafter described and claimed.

Referring to the accompanying drawings, Figure 1 is a perspective view of the trap locked in its open position. Fig. 2 is a cross-section of the same after being unlocked on the dotted line II of Fig. 1. Fig. 3 is a detail view of a slight modification in the trigger construction.

In the said drawings, 1 designates the base-plate, having its ends upturned in the usual or any preferred manner.

2 designates the gravity jaws provided with trunnions 3, journaled in the upturned ends of the plate. The jaws are provided on their inner faces with alternately-arranged tongues and grooves 4, which when the trap is sprung upon the leg of an animal hold the animal securely and prevent the leg from being worked laterally, and thereby imposing strain upon the trap at its weakest point. Said tongues, or some of them, are adapted, by embedding themselves slightly in the leg of the animal, to prevent the animal from withdrawing its foot from between the jaws. The jaws are also provided with the guard-flanges 6, which when the trap is sprung come close together at opposite sides of the leg of the animal caught, and extending above the numb or "dead" line of the leg prevent the animal from gnawing its leg and escaping, as frequently occurs. One of said jaws is provided centrally with the inwardly-projecting integrally-formed loop 7, and at one end, adjacent to its pivotal connection with the base-plate, one arm of one or of each of said jaws is provided with a lug 8, whereon the free end of the actuating-spring 9 is adapted to bear, so as to positively and reliably open the jaws when said spring is depressed by pressure from the operator's foot, said spring being of the customary type and operating in the customary manner.

10 designates a cross-plate which is riveted to the base-plate and is provided with a bifurcated upturned end 11, wherein is pivotally mounted the trigger 12, provided with the usual bait-plate 13, located above the center of the base-plate. This trigger is enlarged above its pivotal point so as to form the hook or shoulder 14 and the hook or shoulder 15. Said shoulders are disposed toward each other, with the shoulder 15 inward of and occupying a higher plane than the shoulder 14, for a purpose which will presently be explained.

The shoulder 14 I designate the "locking-shoulder," and it is designed to automatically engage the jaw at the corresponding side of the trap as it swings down by gravity or by the pressure of the operator's foot as applied through the medium of the actuating-spring and lock said jaw in its depressed position. The momentum of the comparatively heavy jaw causes it as the loop 7 strikes the beveled upper and inner surface of the hook 14 to overcome the weight of the bait-plate and pivotally operate the trigger slightly. Immediately, however, the loop has passed below said hoop the bait-plate swings down to its original position and throws the hook into engagement with the loop, and this locks the jaw automatically. It will now be observed that pressure may be applied downwardly upon the bait-plate without any danger or chance of springing the trap and that the shoulder or hook 15 almost overhangs said loop, to the end that when a light pressure is applied upwardly upon said bait-plate to disengage the locking-hook 14 and the loop the hook 15 will be disposed in the path of the loop as it springs upward under the pressure of the actuating-spring and the trap be in position to close the instant downward pressure is applied upon the bait-plate by an animal's foot or otherwise. Thus it will be seen that in practice it is only necessary after placing the trap to press downwardly upon the spring 9 and cause or permit the jaws to swing open and be automatically locked in such position by the trigger and then apply a light upward pressure upon the bait-plate to cause the engagement of the loop 7 and the hook or shoulder 15.

If it be desired to dispense with the locking operation and make the action entirely automatic with the exception of the downward pressure applied upon the actuating-spring, instead of the shoulder 14 I may employ a beveled shoulder 14$^a$ at the same point, as shown in Fig. 3. By this construction it is obvious that immediately the operator removed the pressure upon the actuating-spring the latter would by its own natural upward pressure upon the beveled shoulder 14$^a$ pivotally operate the bait-plate and slip from engagement with said shoulder to the overhanging shoulder 15, when the trap would be ready for operation, as will be readily understood.

Having thus described the invention, what I claim as new, and desire to secure by Letters Patent, is—

1. An animal-trap, comprising a base-plate, jaws pivoted thereto, one of them provided with a loop, a pivoted trigger provided with a locking-hook adapted to engage the loop of said jaw, and a second hook for engagement with said loop after the latter is disengaged from the locking-hook, and an actuating-spring whereby an upward pressure is brought to bear upon said jaws, substantially as described.

2. An animal-trap, comprising a base-plate, jaws pivoted thereto, one of them having a loop, a cross-plate secured to the base-plate, a trigger pivoted to the cross-plate, provided with a bait-plate, and notched to form a locking-hook and a second hook above and inward of the locking-hook, and a spring which exerts a closing pressure continuously upon said jaws, substantially as described.

In testimony whereof I affix my signature in the presence of two witnesses.

THOMAS H. DONLON.

Witnesses:
M. R. REMLEY,
F. S. THRASHER.